US012640989B2

(12) United States Patent
Zhu

(10) Patent No.: US 12,640,989 B2
(45) Date of Patent: May 26, 2026

(54) DATA ANALYSIS MODEL MANAGEMENT METHOD, AND ELECTRONIC DEVICE AND STORAGE MEDIUM

(71) Applicant: ZTE CORPORATION, Shenzhen (CN)

(72) Inventor: Weihong Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 119 days.

(21) Appl. No.: 18/698,965

(22) PCT Filed: Dec. 19, 2022

(86) PCT No.: PCT/CN2022/140012
§ 371 (c)(1),
(2) Date: Apr. 5, 2024

(87) PCT Pub. No.: WO2023/125109
PCT Pub. Date: Jul. 6, 2023

(65) Prior Publication Data
US 2024/0430171 A1     Dec. 26, 2024

(30) Foreign Application Priority Data
Dec. 30, 2021    (CN) .......................... 202111659735.1

(51) Int. Cl.
*H04L 41/14*          (2022.01)
(52) U.S. Cl.
CPC .................................. *H04L 41/145* (2013.01)

(58) Field of Classification Search
None
See application file for complete search history.

(56) References Cited

U.S. PATENT DOCUMENTS

2019/0036789 A1      1/2019   Kaplunov et al.
2020/0364561 A1*    11/2020   Ananthanarayanan ......................
                                                      H04L 41/0843

FOREIGN PATENT DOCUMENTS

CN          107483222  A       12/2017
CN          110569288  A       12/2019
CN          111901816  A       11/2020
JP          2021083058 A        5/2021
WO          2021047332 A1       3/2021
(Continued)

OTHER PUBLICATIONS

First Office Action in Japanese Application No. 2024-522709, dated Mar. 11, 2025, 13 pages, including translation.
(Continued)

*Primary Examiner* — Fadi Haj Said
(74) *Attorney, Agent, or Firm* — Morgan, Lewis & Bockius LLP

(57) ABSTRACT

Provided are a data analysis model management method, an electronic device and a storage medium. The method includes: acquiring a model management service module on a network management side of a communication network, where the model management service module includes at least one model management service interface; and performing a model management operation on a data analysis model according to the at least one model management service interface.

19 Claims, 4 Drawing Sheets

(56)     References Cited

FOREIGN PATENT DOCUMENTS

WO        2021088520  A1      5/2021

OTHER PUBLICATIONS

International Search Report in Application No. PCT/CN2022/
140012, dated Feb. 11, 2023, 4 pages, including translation.
Deutsche Telekom. "High-level principles and definitions for AI/ML
in RAN" 3GPP TSG-RAN3 Meeting #110-e, R3-206197, Nov. 12,
2020.
Extended European Search Report in Application No. 22914363.1,
dated Jun. 18, 2025, 10 pages.
First Office Action in Korean Application No. 10-2024-7012066,
dated Nov. 25, 2025, 10 pages, including translation.

* cited by examiner

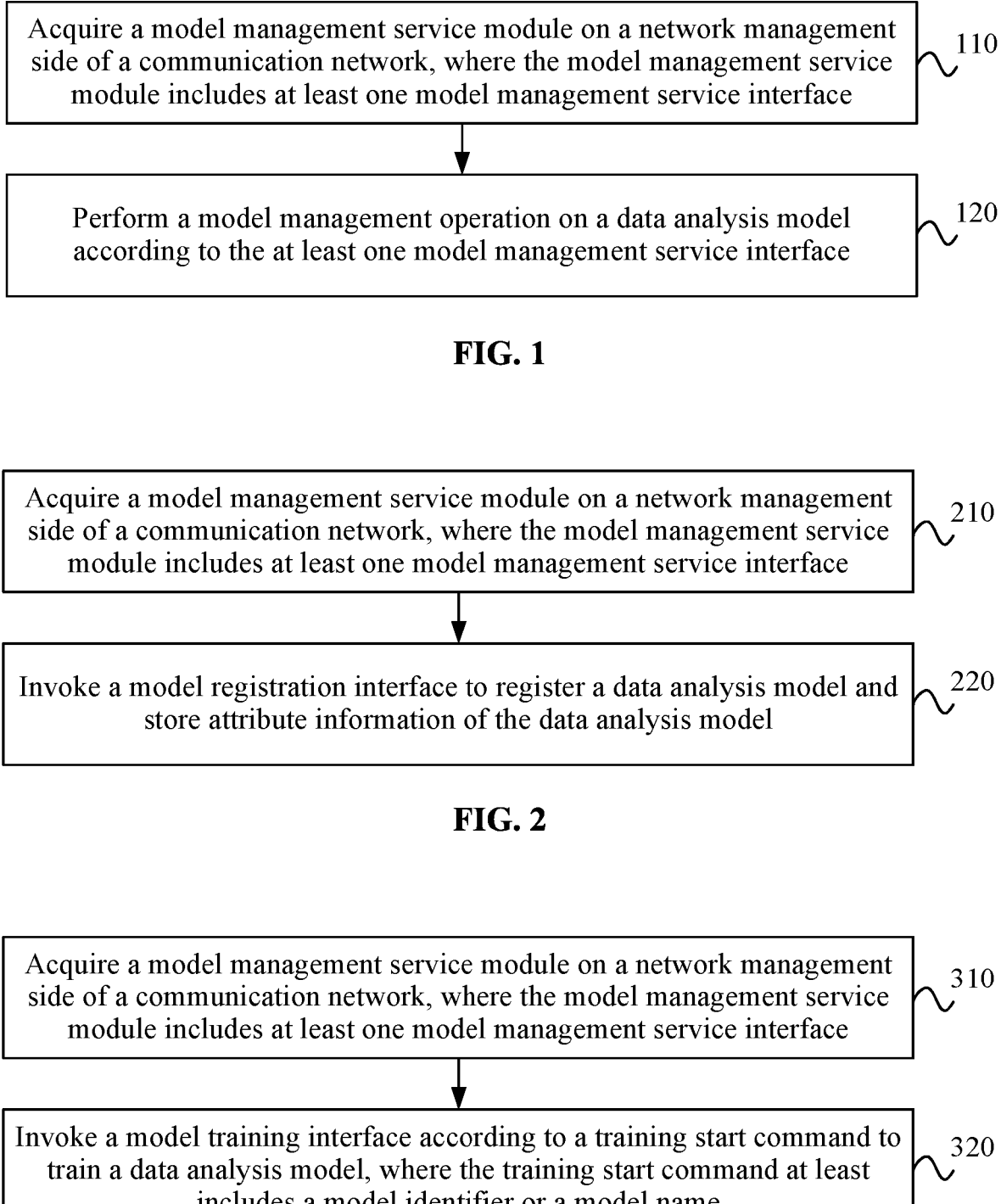

Acquire a model management service module on a network management side of a communication network, where the model management service module includes at least one model management service interface 110

Perform a model management operation on a data analysis model according to the at least one model management service interface 120

FIG. 1

Acquire a model management service module on a network management side of a communication network, where the model management service module includes at least one model management service interface 210

Invoke a model registration interface to register a data analysis model and store attribute information of the data analysis model 220

FIG. 2

Acquire a model management service module on a network management side of a communication network, where the model management service module includes at least one model management service interface 310

Invoke a model training interface according to a training start command to train a data analysis model, where the training start command at least includes a model identifier or a model name 320

FIG. 3

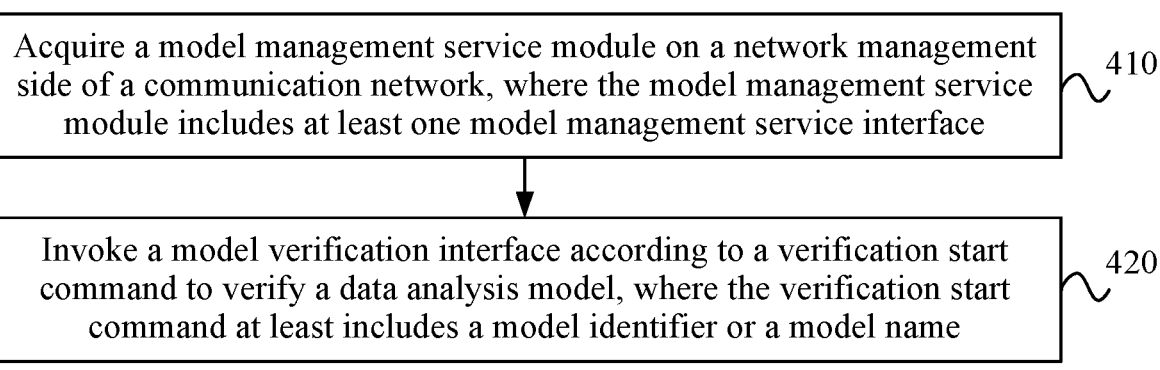

Acquire a model management service module on a network management side of a communication network, where the model management service module includes at least one model management service interface ~410

Invoke a model verification interface according to a verification start command to verify a data analysis model, where the verification start command at least includes a model identifier or a model name ~420

FIG. 4

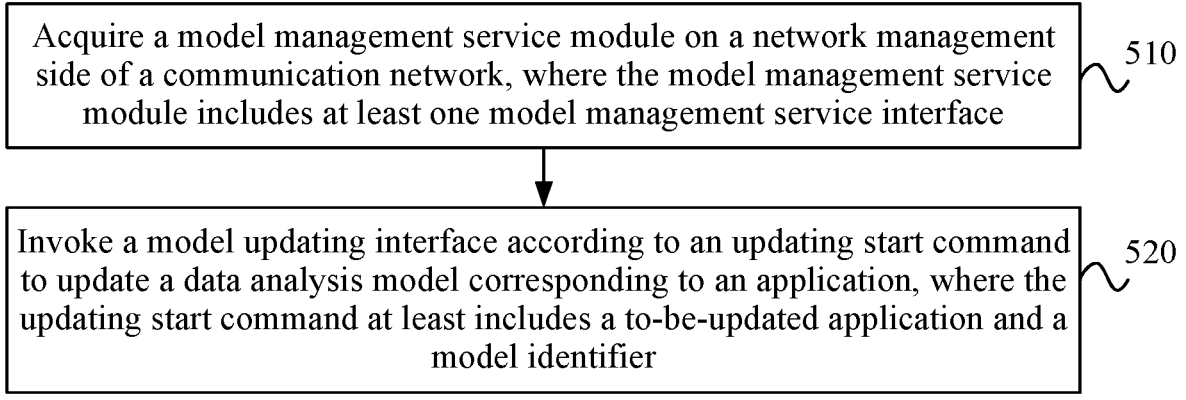

Acquire a model management service module on a network management side of a communication network, where the model management service module includes at least one model management service interface ~510

Invoke a model updating interface according to an updating start command to update a data analysis model corresponding to an application, where the updating start command at least includes a to-be-updated application and a model identifier ~520

FIG. 5

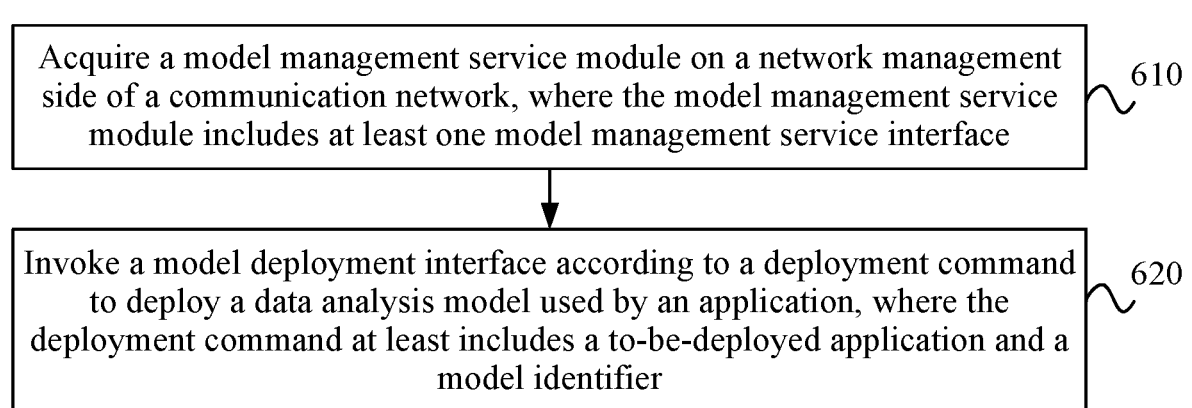

Acquire a model management service module on a network management side of a communication network, where the model management service module includes at least one model management service interface ~610

Invoke a model deployment interface according to a deployment command to deploy a data analysis model used by an application, where the deployment command at least includes a to-be-deployed application and a model identifier ~620

FIG. 6

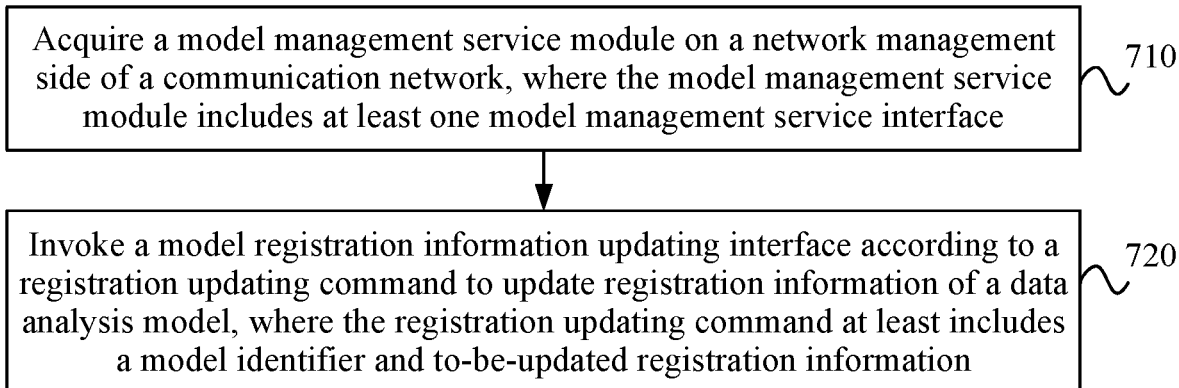

Acquire a model management service module on a network management side of a communication network, where the model management service module includes at least one model management service interface    710

Invoke a model registration information updating interface according to a registration updating command to update registration information of a data analysis model, where the registration updating command at least includes a model identifier and to-be-updated registration information    720

FIG. 7

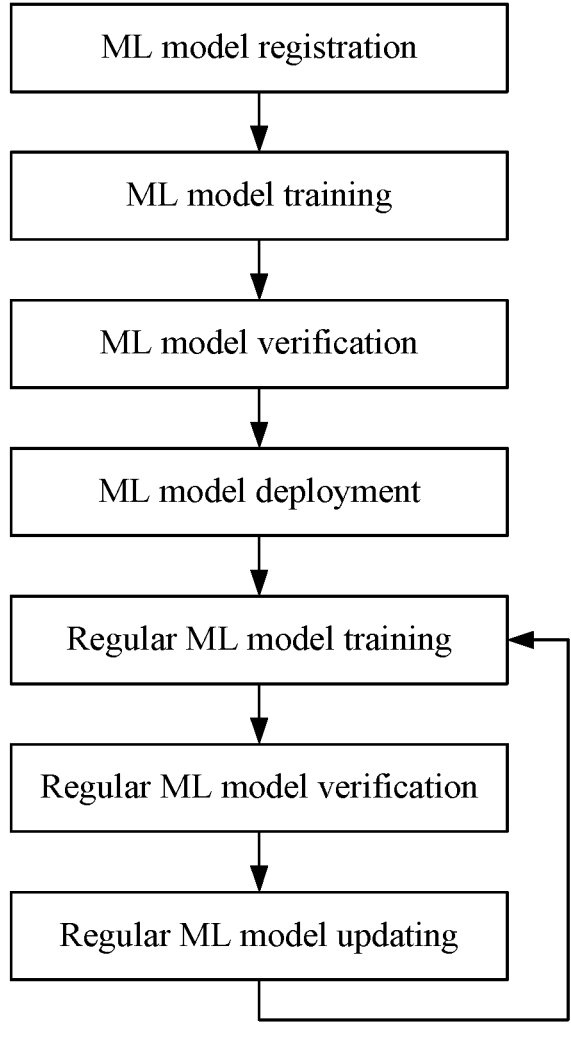

ML model registration

ML model training

ML model verification

ML model deployment

Regular ML model training

Regular ML model verification

Regular ML model updating

| Management service module | Operation performing module |

DATA ANALYSIS MODEL MANAGEMENT METHOD, AND ELECTRONIC DEVICE AND STORAGE MEDIUM

CROSS REFERENCE TO RELATED APPLICATIONS

This application is a national stage application filed under 35 U.S.C. 371 based on International Patent Application No. PCT/CN2022/140012, filed on Dec. 19, 2022, which claims priority to Chinese Patent Application No. 202111659735.1 filed with the China National Intellectual Property Administration (CNIPA) on Dec. 30, 2021, the disclosures of which are incorporated herein by reference in their entireties.

TECHNICAL FIELD

The present application relates to the field of wireless communication technology, for example, a data analysis model management method, an electronic device and a storage medium.

BACKGROUND

Currently, mobile communication technology has entered the era of the 5th generation communication technology (5G), and network slicing is an important part of 5G. The network slicing is mainly an instantiated logical network composed of network functions and having distinctive network characteristics. The network functions include a network resource supporting the network functions. The logical network is used for satisfying the requirements of characteristic network services, for example, satisfying ultra-low latency and ultra-high reliability. With the development of communication technology, in addition to characteristics such as high bandwidth, ultra-low latency and ultra-high reliability, 5G networks further have a high requirement on intelligence. Currently, automation-related technologies in mobile communications may involve self-organized networks (SON) and intent-driven networks. In the 5G network system, artificial intelligence (AI) technology, big data technology and others are further introduced. Based on these technologies, the 5G network system gradually has an intelligent analysis and decision-making capability, and then automatic operation and management of the 5G networks are performed automatically through automatic execution of an intelligent analysis and decision-making result. In research on the 3rd Generation Partnership Project (3GPP), importance of data analysis for system automatic management and operation is also noticed, so concepts of network data analytics function (NWDAF) and management data analytics function (MDAF) are also proposed, and these functions are also researched on the utilization of these functions for system performance optimization, troubleshooting and system resource prediction. On a radio access network (RAN) side, research on an RAN intelligent framework has also been started. AI and machine learning (ML) technologies are used in all these intelligent functions under the RAN intelligent framework. For AI/ML, an ML model is involved. In the research process of the RAN intelligent framework, a proposed scheme is that a network management layer trains an ML model required by intelligent functions on the RAN side, and corresponding updating and deployment are performed after the training. To satisfy this requirement, a corresponding ML model management function needs to be provided in the network management layer, but such a model management function scheme has not been found in the industry currently.

SUMMARY

An embodiment of the present application provides a data analysis model management method. The method includes the steps below.

A model management service module is acquired on a network management side of a communication network, where the model management service module includes at least one model management service interface.

A model management operation is performed on a data analysis model according to the at least one model management service interface.

An embodiment of the present application further provides an electronic device. The electronic device includes one or more processors and a memory configured to store one or more programs.

When executed by the one or more processors, the one or more programs cause the one or more processors to perform the method according to any embodiment of the present application.

An embodiment of the present application further provides a computer-readable storage medium storing a computer program which, when executed by a processor, causes the processor to perform the method according to any embodiment of the present application.

BRIEF DESCRIPTION OF DRAWINGS

FIG. 1 is a flowchart of a data analysis model management method according to an embodiment of the present application.

FIG. 2 is a flowchart of another data analysis model management method according to an embodiment of the present application.

FIG. 3 is a flowchart of another data analysis model management method according to an embodiment of the present application.

FIG. 4 is a flowchart of another data analysis model management method according to an embodiment of the present application.

FIG. 5 is a flowchart of another data analysis model management method according to an embodiment of the present application.

FIG. 6 is a flowchart of another data analysis model management method according to an embodiment of the present application.

FIG. 7 is a flowchart of another data analysis model management method according to an embodiment of the present application.

FIG. 8 is an example diagram illustrating a data analysis model management method according to an embodiment of the present application.

DETAILED DESCRIPTION

Figure 9:
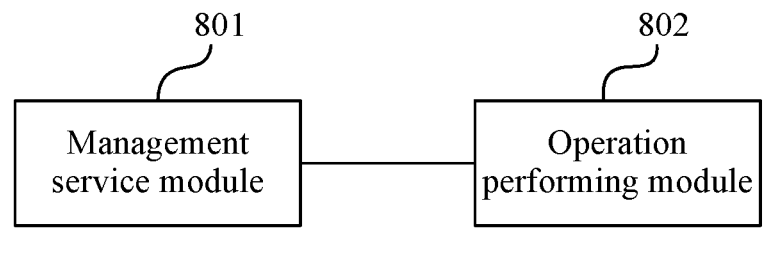
FIG. 9 is a diagram illustrating the structure of a data analysis model management apparatus according to an embodiment of the present application.

It is to be understood that the specific embodiments described herein are merely intended to explain the present application and not to limit the present application.

The wording such as "module", "component", or "unit" used for indicating elements in the subsequent description are merely used for facilitating the description of the present application and have no particular meaning in themselves. Therefore, "module", "component", or "unit" may be used in a mixed manner.

FIG. 1 is a flowchart of a data analysis model management method according to an embodiment of the present application. The embodiment of the present application is applicable to the case of data analysis model management in a wireless communication scenario. The method may be performed by a data analysis model management apparatus provided in an embodiment of the present application. The apparatus may be implemented by software and/or hardware. Referring to FIG. 1, the method provided in the embodiment of the present application includes the steps below.

In S110, a model management service module is acquired on a network management side of a communication network, where the model management service module includes at least one model management service interface.

The network management side of the communication network may be a device side for managing network communications in the wireless communication network or may be an operations support system layer, a network management layer, a network element management layer, a slice management layer, a sub-slice management layer, or another. The model management service module may be a software and hardware module for managing a data analysis model on the network management side of the communication network. One or more model management service interfaces may be included in the model management service model. Each model management service interface may perform different management on the data analysis model.

In the embodiment of the present application, the network management side of the communication network may be provided with the model management service module. The model management service module may include the one or more model management service interfaces. The each model management service interface may be encapsulated with operation rules of different management operations between data analysis models.

In S120, a model management operation is performed on a data analysis model according to the at least one model management service interface.

Specifically, the model management operation on the data analysis model may be performed by invoking the at least one model management service interface so that the difficulty in using the data analysis model in the communication network can be reduced.

In the embodiment of the present application, the model management service module including the at least one model management service interface is acquired on the network management side of the communication network, and the model management operation on the data analysis model is performed by using the at least one model management service interface. In the embodiment of the present application, unified management is performed on data analysis models in the communication network through model management operations so that the difficulty in using the data analysis models can be reduced, the model management efficiency can be improved, and the stability of data transmission in the communication network can be ensured.

In an embodiment, based on the preceding embodiment, the at least one model management service interface at least include: a model registration interface, a model training interface, a model verification interface, a model updating interface, a model deployment interface and a model registration information updating interface.

Specifically, the model management service module may be composed of interfaces such as the model registration interface, the model training interface, the model verification interface, the model updating interface, the model deployment interface and the model registration information updating interface, operations such as model registration, model training, model verification, model updating, model deployment and registration information updating may be performed by invoking the interfaces, and a processing rule of a corresponding operation may be preset in each interface.

FIG. 2 is a flowchart of another data analysis model management method according to an embodiment of the present application. Referring to FIG. 2, the method provided in the embodiment of the present application includes the steps below using model registration as an example.

In S210, a model management service module is acquired on a network management side of a communication network, where the model management service module includes at least one model management service interface.

In S220, a model registration interface is invoked to register a data analysis model, and attribute information of the data analysis model is stored.

The model registration interface may be a software program interface. The model registration interface may be encapsulated with a processing rule for registering the data analysis model. When being invoked, the model registration interface may register information of the data analysis model to a preset position. The preset position may be a preset storage space on the network management side of the communication network.

In the embodiment of the present application, the attribute information of the data analysis model may be stored using the model registration interface by invoking the model registration interface in the model management service module so as to perform the registration process of the data analysis model, and a user may perform processing based on the registered data analysis model.

In an embodiment, based on the preceding embodiment, the attribute information includes at least one of: a model identifier, a model name, a model function description, a model algorithm type, a model parameter, an initial model hyperparameter, a training data set, or a test data set.

In the embodiment of the present application, the data analysis model may be registered by storing one or more of the model identifier, the model name, the model function description, the model algorithm type, the model parameter, the initial model hyperparameter, the training data set and the test data set of the data analysis model, and an application in the communication network may use the data analysis model based on the preceding attribute information.

In the embodiment of the present application, the model registration interface may be invoked to register the data analysis model, and the attribute information of the data analysis model may be stored in the preset storage space so that the data analysis model can be registered.

FIG. 3 is a flowchart of another data analysis model management method according to an embodiment of the present application. Referring to FIG. 3, the method provided in the embodiment of the present application includes the steps below using model training as an example.

In S310, a model management service module is acquired on a network management side of a communication network, where the model management service module includes at least one model management service interface.

In S320, a model training interface is invoked according to a training start command to train a data analysis model, where the training start command at least includes a model identifier or a model name.

The training start command may be indication information controlling the model to train and may include the model identifier or the model name of the to-be-trained data analysis model. The model identifier or the model name may be composed of numbers, letters, or special characters.

Specifically, when the training start command is received, the model identifier or the model name that is included in the training start command may be extracted, and the data analysis model corresponding to the model identifier or the model name is acquired and trained by the model training interface.

FIG. 4 is a flowchart of another data analysis model management method according to an embodiment of the present application. Referring to FIG. 4, the method provided in the embodiment of the present application includes the steps below using the verification of a data analysis model as an example.

In S410, a model management service module is acquired on a network management side of a communication network, where the model management service module includes at least one model management service interface.

In S420, a model verification interface is invoked according to a verification start command to verify a data analysis model, where the verification start command at least includes a model identifier or a model name.

The verification start command may be indication information controlling the model to train and may include the model identifier or the model name of the to-be-verified data analysis model. The model identifier or the model name may be composed of numbers, letters, or special characters.

In the embodiment of the present application, when the verification start command is received, the model verification interface is invoked through the model identifier or the model name that is included in the verification start command to acquire the corresponding data analysis model for verification.

FIG. 5 is a flowchart of another data analysis model management method according to an embodiment of the present application. Referring to FIG. 5, the method provided in the embodiment of the present application includes the steps below using the updating of an application using a data analysis model as an example.

In S510, a model management service module is acquired on a network management side of a communication network, where the model management service module includes at least one model management service interface.

In S520, a model updating interface is invoked according to an updating start command to update a data analysis model corresponding to an application, where the updating start command at least includes a to-be-updated application and a model identifier.

The updating start command may be indication information controlling updating of the data analysis model and may include the to-be-updated application and the model identifier of the to-be-updated data analysis model. The model identifier may be the only identification information of the to-be-updated data analysis model. The to-be-updated application may be an application using the data analysis model.

In the embodiment of the present application, when the updating start command is received, the to-be-updated application and the model identifier in the updating start command may be extracted and the model updating interface is invoked using the to-be-updated application and the model identifier, and the data analysis model used by the to-be-updated application is updated through the model updating interface.

FIG. 6 is a flowchart of another data analysis model management method according to an embodiment of the present application. Referring to FIG. 6, the method provided in the embodiment of the present application includes the steps below using the deployment of a data analysis model as an example.

In S610, a model management service module is acquired on a network management side of a communication network, where the model management service module includes at least one model management service interface.

In S620, a model deployment interface is invoked according to a deployment command to deploy a data analysis model used by an application, where the deployment command at least includes a to-be-deployed application and a model identifier.

Specifically, when the deployment command is received, the model deployment interface may be invoked to deploy the data analysis model corresponding to the model identifier to the to-be-deployed application so that the to-be-deployed application can fulfill functions according to the data analysis model.

FIG. 7 is a flowchart of another data analysis model management method according to an embodiment of the present application. Referring to FIG. 7, the method provided in the embodiment of the present application includes the steps below using the updating of model registration information as an example.

In S710, a model management service module is acquired on a network management side of a communication network, where the model management service module includes at least one model management service interface.

In S720, a model registration information updating interface is invoked according to a registration updating command to update registration information of a data analysis model, where the registration updating command at least includes a model identifier and to-be-updated registration information.

In the embodiment of the present application, when the registration updating command is received, the model registration information updating interface may be invoked according to the model identifier and the to-be-updated registration information in the registration updating command to replace original registration information corresponding to the model identifier with the to-be-updated registration information so that the registration information can be updated.

In an embodiment, based on the preceding embodiment, the method further includes the following step. Notification information is generated according to an execution result of the model management operation and is transmitted to an application corresponding to the data analysis model.

In the embodiment of the present application, after the model management operation is completed, the corresponding notification information, the information being such as a model registration success or a model updating success, may be generated according to the execution result and may be sent to the application in which the data analysis model is deployed to remind the application to use the data analysis model corresponding to the information.

In an embodiment, based on the preceding embodiment, the model management service module is located in at least one of: an operations support system (OSS) layer, a network management layer, a network element management layer, a slice management layer, or a sub-slice management layer.

FIG. 8 is an example diagram illustrating a data analysis model management method according to an embodiment of the present application. Referring to FIG. 8, a data analysis model may be specifically an ML model, and the management method provided in the embodiment of the present application includes the steps below.

1) The ML model is registered (or published) to a model database (or a model market) through an ML model registration (or publication) interface.

2) The registered ML model is trained through an ML model training interface.

3) The trained ML model is verified through an ML model verification interface.

4) The verified ML model is deployed to a particular application through an ML model deployment interface.

5) That the ML model is trained, verified and updated regularly includes that the ML model training interface is started regularly to train the ML model, the ML model verification interface is invoked to train the trained ML model, and through an ML model updating interface, the trained ML model is updated to a characteristic application in which the ML model has been deployed.

6) According to needs, an ML model registration information updating model is invoked to update model registration information, where the needs may include a model algorithm variation, a training data set variation, a test data set variation and others.

Management of the preceding ML model may be performed through an ML management service module. The ML management service module may include, but is not limited to, the following functional interfaces: the ML model registration interface, the ML model training interface, the ML model verification interface, the ML model updating interface, the ML model deployment interface and the ML model registration information updating interface.

The ML model registration interface provides an ML model registration function. The RAN intelligent framework, the RAN intelligent functions under the RAN intelligent framework, or any other authenticated consumer that may provide the ML model may register the ML model by invoking the ML model registration interface. The registration information includes, but is not limited to, one or more of the following attributes: a model identifier, a model name, a model function description, a model algorithm type (or a model algorithm specific definition), a model parameter, an initial (or default) model hyperparameter, a training data set acquisition path, a training data set, a model test data set acquisition path and a model test data set. After the ML model is registered, corresponding model information is generated and stored in the model database (or the model market). The model information further includes an attribute that stores identification information of the application using the ML model, and the value of the attribute is empty when the ML model is registered. The preceding training data set acquisition path and model test data set acquisition path may also be replaced by a specific model training data set and model test data set respectively.

The ML model training interface provides an ML model training function. The RAN intelligent framework, or the RAN intelligent functions, superior network management systems and local network management functions that are under the RAN intelligent framework, or any other authenticated consumer may start the training of the ML model by invoking the ML model training interface. When the model training is started, a start command at least includes one of a model identifier or a model name. The corresponding ML model and parameters such as the initial (or default) model hyperparameter, the training data set acquisition path, or the training data set are first acquired from the model database according to the model identifier or the model name, and the model training is then started according to the acquired parameters. After the training is completed, corresponding information in the model database is updated. Meanwhile, a model training completion notification may also be sent to the consumer starting the training, and the same notification may also be sent to other applications using the ML model at the same time.

The ML model verification interface provides an ML model verification function. The RAN intelligent framework, or the RAN intelligent functions, the superior network management systems and the local network management functions that are under the RAN intelligent framework, or the any other authenticated consumer may start the verification of the ML model by invoking the ML model verification interface. When the model verification is started, a start command at least includes one of a model identifier or a model name. Corresponding parameters such as the model test data set acquisition path, or the model test data set are first acquired from the model database according to the model identifier or the model name, and the model verification is then started according to the acquired parameters or data. After the verification is completed, corresponding information in the model database is updated. Meanwhile, a model verification result notification may also be sent to the consumer starting the model verification, and the same notification may also be sent to other applications using the ML model at the same time.

The ML model updating interface provides an ML model updating function. The RAN intelligent framework, or the RAN intelligent functions, the superior network management systems and the local network management functions that are under the RAN intelligent framework, or the any other authenticated consumer may start the updating of the ML model by invoking the ML model updating interface. When the model updating is started, a start command at least includes one of a model identifier or a model name and also includes an application identifier or an application list that needs the ML model to update. Corresponding model information may be acquired from the model database according to the model identifier or the model name, and the ML model is updated. After the updating is completed, a model updating completion notification is sent to the consumer starting the model updating, and the same notification may also be sent to an application in which the ML model has been updated.

In the embodiment of the present application, the ML model management service module may be located in the operations support system layer, the network management layer, the network element management layer, the slice management layer and the sub-slice management layer.

In another exemplary embodiment, an ML model information model, an ML model Information Object Class (IOC), or an ML model managed object class (MOC) is defined. The preceding model may be named MLModel. The preceding ML model information model includes, but is not limited to, one of the following attributes: an ML model identifier (which is denoted as MLModelID) for uniquely identifying a model: an ML model algorithm definition for defining a model algorithm: an ML model parameter for recording a model parameter, where when the model is just registered, an initial or default model parameter is recorded: and after the model training, a model parameter after the training is recorded: an initial (or default) model hyperparameter for recording a hyperparameter of the model: a training data set acquisition path or a training data set; a model test data set acquisition path or a model test data set: 7) a model state for recording a state of the model, where usable states include, but are not limited to, untrained, being trained, already trained, unverified, already verified, undeployed and already deployed: or 8) a model deployment application list for recording applications in which the model has been deployed. The preceding ML model information model may further include the following attributes: a model name and a model function description. The model registration may be completed by creating an MLModel example through a createMOI operation. Model deletion is completed by deleting the MLModel example through a deleteMOI operation. The model training is first completed through a model training operation, a model parameter obtained after the training is then written into the MLModel example through a modify MOIAttributes operation, and the model state is modified. Model deployment is first completed through a model deployment operation, the model state in the MLModel example is then modified through the modify MOIAttributes operation, and information of applications in which the model is deployed is recorded. For the ML model registration information updating, registration information in the MLModel example is modified through the modifyMOIAttributes operation, where the registration information includes the algorithm definition, the initial (or default) model hyperparameter, the training data set acquisition path, the model test data set acquisition path and others.

FIG. 9 is a diagram illustrating the structure of a data analysis model management apparatus according to an embodiment of the present application. The apparatus may perform the data analysis model management method according to any embodiment of the present application, has corresponding function modules and beneficial effects of the performed method and may be implemented by software and/or hardware. The apparatus includes a management service module 801 and an operation performing module 802.

The management service module 801 is configured to acquire a model management service module on a network management side of a communication network, where the model management service module includes at least one model management service interface.

The operation performing module 802 is configured to perform a model management operation on a data analysis model according to the at least one model management service interface In the embodiment of the present application, the management service module acquires the model management service module including the at least one model management service interface on the network management side of the communication network, and the operation performing module performs the model management operation on the data analysis model by using the at least one model management service interface. In the embodiment of the present application, unified management is performed on data analysis models in the communication network through model management operations so that the difficulty in using the data analysis models can be reduced, the model management efficiency can be improved, and the stability of data transmission in the communication network can be ensured.

In an embodiment, based on the preceding embodiment, the at least one model management service interface in the apparatus at least include: a model registration interface, a model training interface, a model verification interface, a model updating interface, a model deployment interface and a model registration information updating interface.

In an embodiment, based on the preceding embodiment, the operation performing module 802 in the apparatus includes a registration unit configured to invoke the model registration interface to register the data analysis model and store attribute information of the data analysis model.

In an embodiment, based on the preceding embodiment, the attribute information includes at least one of: a model identifier, a model name, a model function description, a model algorithm type, a model parameter, an initial model hyperparameter, a training data set, or a test data set.

In an embodiment, based on the preceding embodiment, the operation performing module 802 in the apparatus includes a training unit configured to invoke, according to a training start command, the model training interface to train the data analysis model, where the training start command at least includes a model identifier or a model name.

In an embodiment, based on the preceding embodiment, the operation performing module 802 in the apparatus includes a verification unit configured to invoke, according to a verification start command, the model verification interface to verify the data analysis model, where the verification start command at least includes a model identifier or a model name.

In an embodiment, based on the preceding embodiment, the operation performing module 802 in the apparatus includes an updating unit configured to invoke, according to an updating start command, the model updating interface to update the data analysis model corresponding to an application, where the updating start command at least includes a to-be-updated application and a model identifier.

In an embodiment, based on the preceding embodiment, the operation performing module 802 in the apparatus includes a deployment unit configured to invoke, according to a deployment command, the model deployment interface to deploy the data analysis model used by an application, where the deployment command at least includes a to-be-deployed application and a model identifier.

In an embodiment, based on the preceding embodiment, the operation performing module 802 in the apparatus includes an information registration unit configured to invoke, according to a registration updating command, the model registration information updating interface to update registration information of the data analysis model, where the registration updating command at least includes a model identifier and to-be-updated registration information.

In an embodiment, based on the preceding embodiment, the apparatus further includes an information notification module configured to generate notification information according to an execution result of the model management operation and transmit the notification information to an application corresponding to the data analysis model.

In an embodiment, based on the preceding embodiment, the model management service module in the apparatus is located in at least one of an operations support system layer, a network management layer, a network element management layer, a slice management layer, or a sub-slice management layer.

Figure 10:
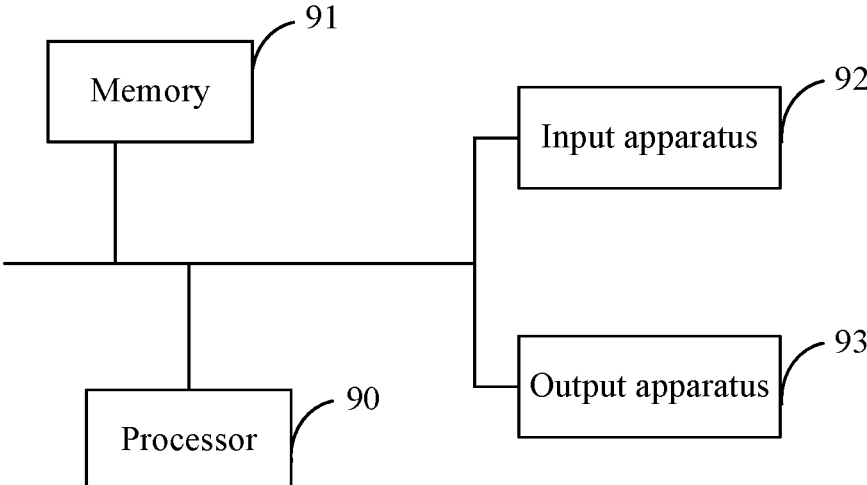
FIG. 10 is a diagram illustrating the structure of an electronic device according to an embodiment of the present application.

FIG. 10 is a diagram illustrating the structure of an electronic device according to an embodiment of the present application. The electronic device includes a processor 90, a memory 91, an input apparatus 92 and an output apparatus 93. One or more processors 90 may be provided in the electronic device, with one processor 90 shown as an example in FIG. 10. The processor 90, the memory 91, the input apparatus 92 and the output apparatus 93 in the electronic device may be connected via a bus or in other manners, with connection via the bus shown as an example in FIG. 10.

As a computer-readable storage medium, the memory 91 may be configured to store software programs, computer executable programs and modules, for example, modules (a management service module 801 and an operation performing module 802) corresponding to the data transmission apparatus in the embodiment of the present application. The processor 90 runs the software programs, instructions and modules that are stored in the memory 91 to perform function applications and data processing of the electronic device, that is, to perform the preceding data analysis model management method.

The memory 91 may mainly include a program storage region and a data storage region, where the program storage region may store an operating system and an application program required by at least one function, and the data storage region may store data created according to the use of the electronic device. Additionally, the memory 91 may include a high-speed random-access memory or a nonvolatile memory such as at least one disk memory, a flash memory, or another nonvolatile solid-state memory. In some examples, the memory 91 may further include a memory remotely disposed with respect to the processor 90. These remote memories may be connected to the electronic device via a network. Examples of the preceding network include, but are not limited to, the Internet, an intranet, a local area network, a mobile communication network and a combination thereof.

The input apparatus 92 may be configured to receive inputted digital or character information and generate key signal input related to user settings and function control of the electronic device. The output apparatus 93 may include a display device such as a display screen.

An embodiment of the present application further provides a storage medium including computer-executable instructions which, when executed by a computer processor, are configured to cause the computer processor to perform a data analysis model management method. The method includes the steps below.

A model management service module is acquired on a network management side of a communication network, where the model management service module includes at least one model management service interface.

A model management operation is performed on a data analysis model according to the at least one model management service interface.

From the preceding description of embodiments, it will be apparent to those skilled in the art that the present application may be implemented by use of software and necessary general-purpose hardware, or may be certainly implemented by hardware, but the former is a preferred embodiment in many cases. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk or an optical disc of a computer and includes several instructions for causing a computer device (which may be a personal computer, a server, or a network device) to perform the method in the embodiments of the present application.

It is to be noted that units and modules that are included in the embodiment of the apparatus are merely divided according to functional logic, and the division is not limited to this as long as the corresponding functions can be performed. Additionally, the specific names of function units are merely intended for distinguishing between each other and are not to limit the scope of the present application.

It is to be understood by those of ordinary skill in the art that some or all steps of the preceding disclosed method and function modules/units in the preceding system or device may be implemented as software, firmware, hardware and suitable combinations thereof.

In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor, or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As known to those of ordinary skill in the art, the term "computer storage media" includes volatile and non-volatile as well as removable and non-removable media implemented in any method or technology for storing information (such as computer-readable instructions, data structures, program modules, or other data). The computer storage media include, but are not limited to, a RAM, a ROM, an electrically erasable programmable read-only memory (EE-PROM), a flash memory, or other memory technologies, a compact disc read-only memory (CD-ROM), a digital versatile disc (DVD) or other optical disc memories, magnetic cassettes, magnetic tapes, magnetic disk memories or other magnetic storage apparatuses, or any other medium used for storing the desired information and accessible by a computer. Moreover, as known to those of ordinary skill in the art, the communication media generally include computer-readable instructions, data structures, program modules, or other data in carriers or in modulated data signals transported in other transport mechanisms and may include any information delivery medium.

Some embodiments of the present application are described with reference to the drawings in the preceding and are not intended to limit the scope of the appended claims of the present application. Any modifications, equivalent replacements and improvements made by those skilled in the art without departing from the scope and substantive content of the present application should be within the scope of the appended claims of the present application.

What is claimed is:

1. A data analysis model management method, comprising:

acquiring a model management service module on a network management side of a communication network, wherein the model management service module comprises at least one model management service interface and is located in at least one of: a network management layer, a network element management layer, a slice management layer, or a sub-slice management layer; and performing a model management operation on a data analysis model in a Radio Access Network (RAN) according to the at least one model management service interface.

2. The method according to claim 1, wherein the at least one model management service interface comprises at least one of: a model registration interface, a model training interface, a model verification interface, a model updating interface, a model deployment interface or a model registration information updating interface.

3. The method according to claim 1, wherein performing the model management operation on the data analysis model according to the at least one model management service interface comprises:

in a case where the at least one model management service interface comprises a model registration interface, invoking the model registration interface to register the data analysis model and storing attribute information of the data analysis model.

4. The method according to claim 3, wherein the attribute information comprises at least one of: a model identifier, a model name, a model function description, a model algorithm type, a model parameter, an initial model hyperparameter, a training data set, or a test data set.

5. The method according to claim 1, wherein performing the model management operation on the data analysis model according to the at least one model management service interface comprises:

in a case where the at least one model management service interface comprises a model training interface, invoking, according to a training start command, a model training interface to train the data analysis model, wherein the training start command at least comprises a model identifier or a model name.

6. The method according to claim 1, wherein performing the model management operation on the data analysis model according to the at least one model management service interface comprises:

in a case where the at least one model management service interface comprises a model verification interface, invoking, according to a verification start command, the model verification interface to verify the data analysis model, wherein the verification start command at least comprises a model identifier or a model name.

7. The method according to claim 1, wherein performing the model management operation on the data analysis model according to the at least one model management service interface comprises:

in a case where the at least one model management service interface comprises a model updating interface, invoking, according to an updating start command, the model updating interface to update the data analysis model corresponding to an application, wherein the updating start command at least comprises a to-be-updated application and a model identifier.

8. The method according to claim 1, wherein performing the model management operation on the data analysis model according to the at least one model management service interface comprises:

in a case where the at least one model management service interface comprises a model deployment interface, invoking, according to a deployment command, the model deployment interface to deploy the data analysis model used by an application, wherein the deployment command at least comprises a to-be-deployed application and a model identifier.

9. The method according to claim 1, wherein performing the model management operation on the data analysis model according to the at least one model management service interface comprises:

in a case where the at least one model management service interface comprises a model registration information updating interface, invoking, according to a registration updating command, the model registration information updating interface to update registration information of the data analysis model, wherein the registration updating command at least comprises a model identifier and to-be-updated registration information.

10. The method according to claim 1, further comprising:

generating notification information according to an execution result of the model management operation and transmitting the notification information to an application corresponding to the data analysis model.

11. The method according to claim 2, wherein performing the model management operation on the data analysis model according to the at least one model management service interface comprises:

in a case where the at least one model management service interface comprises the model registration interface, invoking the model registration interface to register the data analysis model and storing attribute information of the data analysis model.

12. The method according to claim 2, wherein performing the model management operation on the data analysis model according to the at least one model management service interface comprises:

in a case where the at least one model management service interface comprises the model training interface, invoking, according to a training start command, the model training interface to train the data analysis model, wherein the training start command at least comprises a model identifier or a model name.

13. The method according to claim 2, wherein performing the model management operation on the data analysis model according to the at least one model management service interface comprises:

in a case where the at least one model management service interface comprises the model verification interface, invoking, according to a verification start command, the model verification interface to verify the data analysis model, wherein the verification start command at least comprises a model identifier or a model name.

14. The method according to claim 2, wherein performing the model management operation on the data analysis model according to the at least one model management service interface comprises:

in a case where the at least one model management service interface comprises the model updating interface, invoking, according to an updating start command, the model updating interface to update the data analysis model corresponding to an application, wherein the updating start command at least comprises a to-be-updated application and a model identifier.

15. The method according to claim 2, wherein performing the model management operation on the data analysis model according to the at least one model management service interface comprises:

in a case where the at least one model management service interface comprises the model deployment interface, invoking, according to a deployment command, the model deployment interface to deploy the data analysis model used by an application, wherein the deployment command at least comprises a to-be-deployed application and a model identifier.

16. The method according to claim 2, wherein performing the model management operation on the data analysis model according to the at least one model management service interface comprises:

in a case where the at least one model management service interface comprises the model registration information updating interface, invoking, according to a registration updating command, the model registration information updating interface to update registration information of the data analysis model, wherein the registration updating command at least comprises a model identifier and to-be-updated registration information.

17. The method according to claim 2, further comprising:

generating notification information according to an execution result of the model management operation and transmitting the notification information to an application corresponding to the data analysis model.

18. An electronic device, comprising:

one or more processors; and a memory configured to store one or more programs, wherein when executed by the one or more processors, the one or more programs cause the one or more processors to perform:

acquiring a model management service module on a network management side of a communication network, wherein the model management service module comprises at least one model management service interface and is located in at least one of: a network management layer, a network element management layer, a slice management layer, or a sub-slice management layer; and performing a model management operation on a data analysis model in a Radio Access Network (RAN) according to the at least one model management service interface.

19. A non-transitory computer-readable storage medium storing a computer program which, when executed by a processor, causes the processor to perform:

acquiring a model management service module on a network management side of a communication network, wherein the model management service module comprises at least one model management service interface and is located in at least one of: a network management layer, a network element management layer, a slice management layer, or a sub-slice management layer; and performing a model management operation on a data analysis model in a Radio Access Network (RAN) according to the at least one model management service interface.

\*　\*　\*　\*　\*